US007731616B2

(12) United States Patent
Han

(10) Patent No.: US 7,731,616 B2
(45) Date of Patent: Jun. 8, 2010

(54) VARIABLE MOTION CONTROL DEVICES FOR TRANSMISSION AND OTHER IMPLEMENTATIONS AND METHODS OF USE THEREOF

(75) Inventor: Kyung-Soo Han, Timonium, MD (US)

(73) Assignee: Differential Dynamics Corporation, Owing Mills, MD (US)

(*) Notice: Subject to any disclaimer, the term of this patent is extended or adjusted under 35 U.S.C. 154(b) by 646 days.

(21) Appl. No.: 11/498,965

(22) Filed: Aug. 4, 2006

(65) Prior Publication Data

US 2007/0082779 A1   Apr. 12, 2007

Related U.S. Application Data

(60) Provisional application No. 60/705,490, filed on Aug. 5, 2005.

(51) Int. Cl.
*F16H 37/02* (2006.01)
*F16H 35/02* (2006.01)
*F16H 3/44* (2006.01)
*F16H 29/04* (2006.01)

(52) U.S. Cl. .................. 475/207; 475/14; 475/324; 475/325; 74/117

(58) Field of Classification Search .............. 475/8, 475/14, 15, 16, 207, 219, 198, 339, 323, 475/324, 325; 74/117
See application file for complete search history.

(56) References Cited

U.S. PATENT DOCUMENTS

| | | | | |
|---|---|---|---|---|
| 3,161,241 A | * | 12/1964 | Allen et al. | 173/14 |
| 3,848,474 A | * | 11/1974 | Epstein | 74/117 |
| 4,279,177 A | * | 7/1981 | Yamashita | 475/5 |
| 5,016,493 A | | 5/1991 | Han | |
| 5,116,292 A | | 5/1992 | Han | |
| 5,169,359 A | | 12/1992 | Han | |
| 5,308,293 A | | 5/1994 | Han | |
| 5,392,664 A | * | 2/1995 | Gogins | 74/117 |
| 5,454,766 A | * | 10/1995 | Mills | 475/170 |
| 5,632,702 A | * | 5/1997 | Mills | 475/170 |
| 5,951,424 A | * | 9/1999 | Briceland | 475/72 |
| 6,068,570 A | | 5/2000 | Han | |
| 6,537,168 B1 | | 3/2003 | Han | |
| 7,462,124 B2 | | 12/2008 | Han | |
| 2003/0221892 A1 | * | 12/2003 | Matsumoto et al. | 180/230 |
| 2005/0049107 A1 | * | 3/2005 | Willmot et al. | 475/339 |
| 2007/0082779 A1 | | 4/2007 | Han | |

* cited by examiner

*Primary Examiner*—Roger Pang
(74) *Attorney, Agent, or Firm*—PCT Law Group, PLLC; Raymond Millien; Thomas H. Jackson

(57) ABSTRACT

Numerous implementations of variable motion control devices and methods of use thereof. The devices and methods provide variable output to such output devices as vehicles. The variable motion control devices are locatable between output devices and power sources, such as in vehicle transmission applications between the engine and driveline, wherein an output of a power source is input into the device, which, in turn, provides a variable output to the vehicle drive line or other output application.

39 Claims, 11 Drawing Sheets

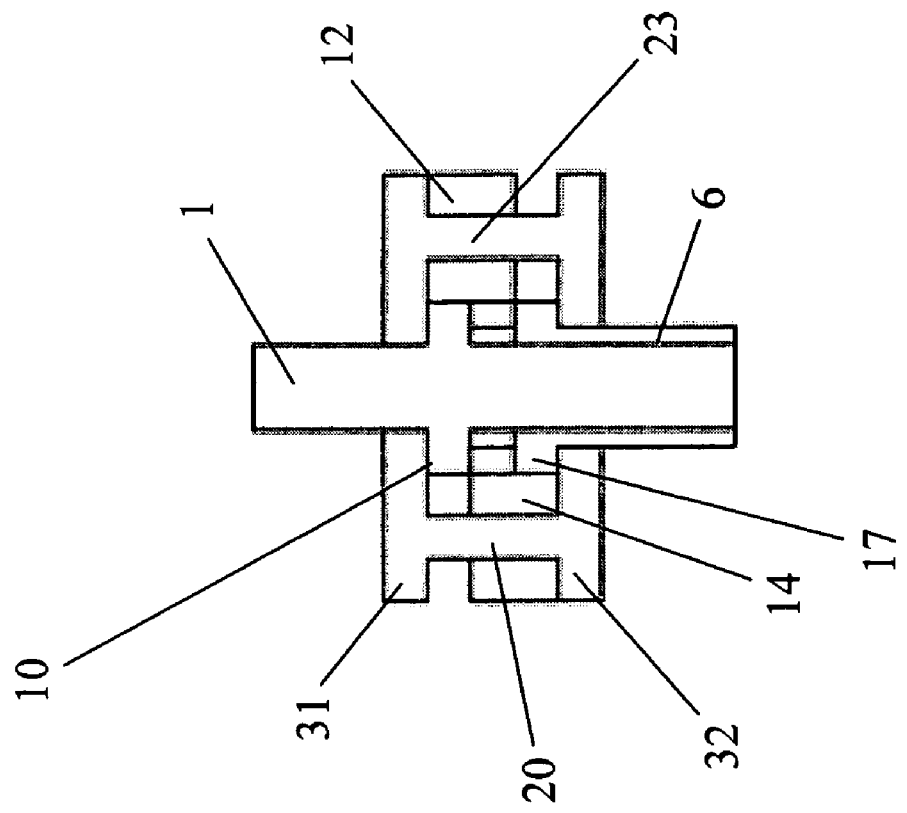
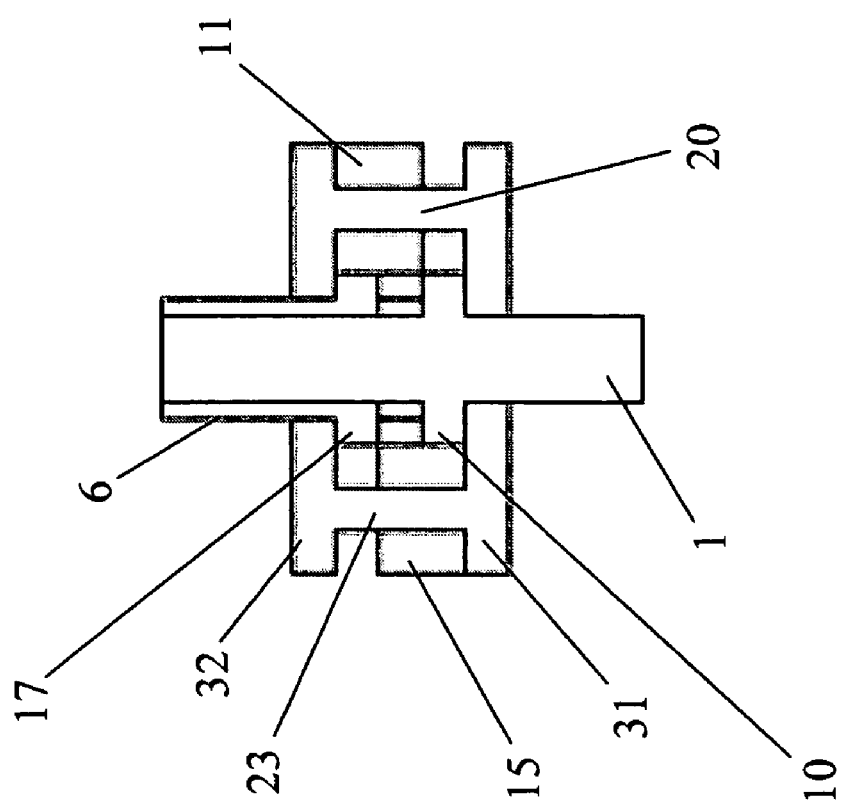
FIG. 2B
FIG. 2A

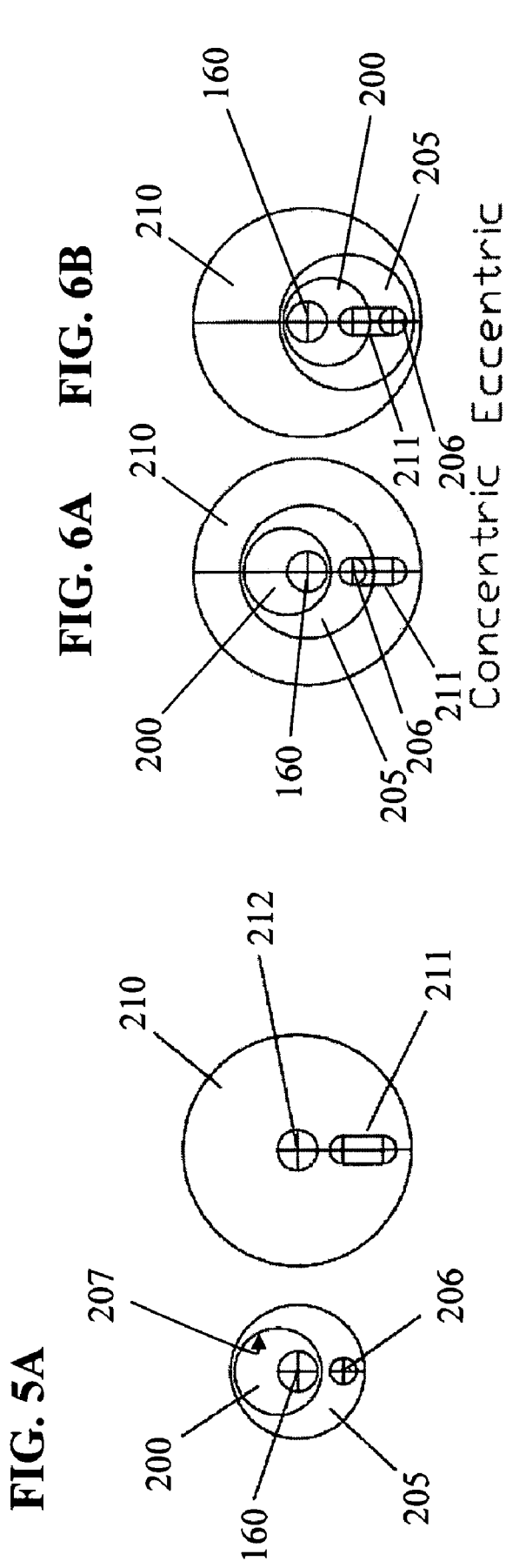

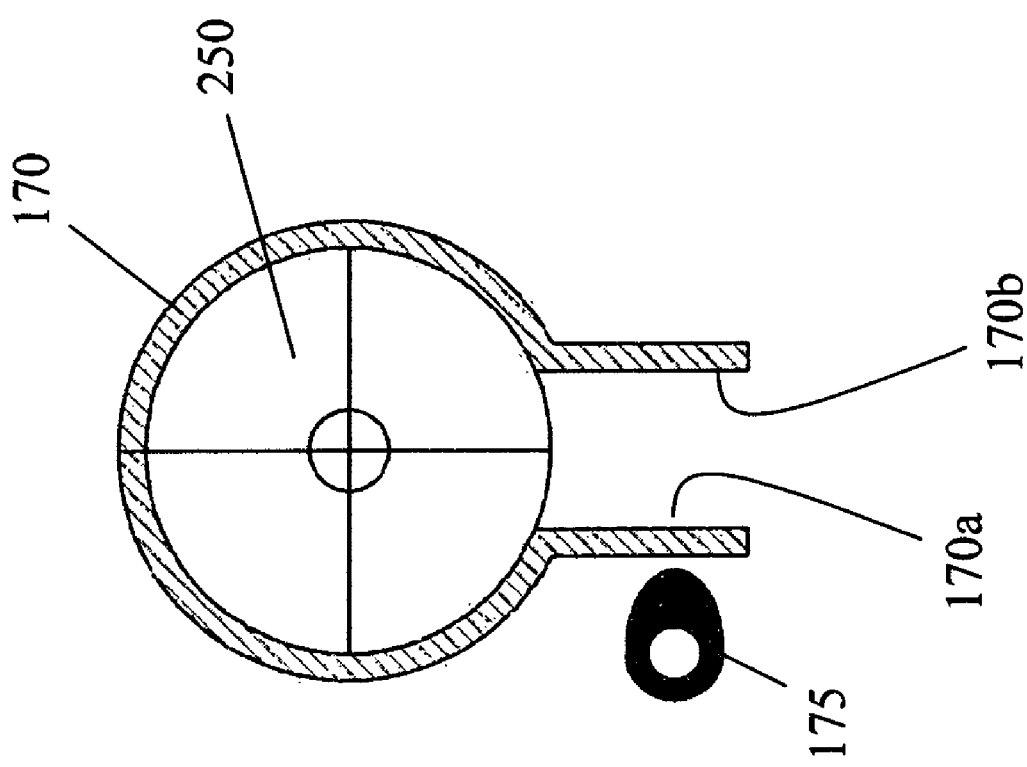
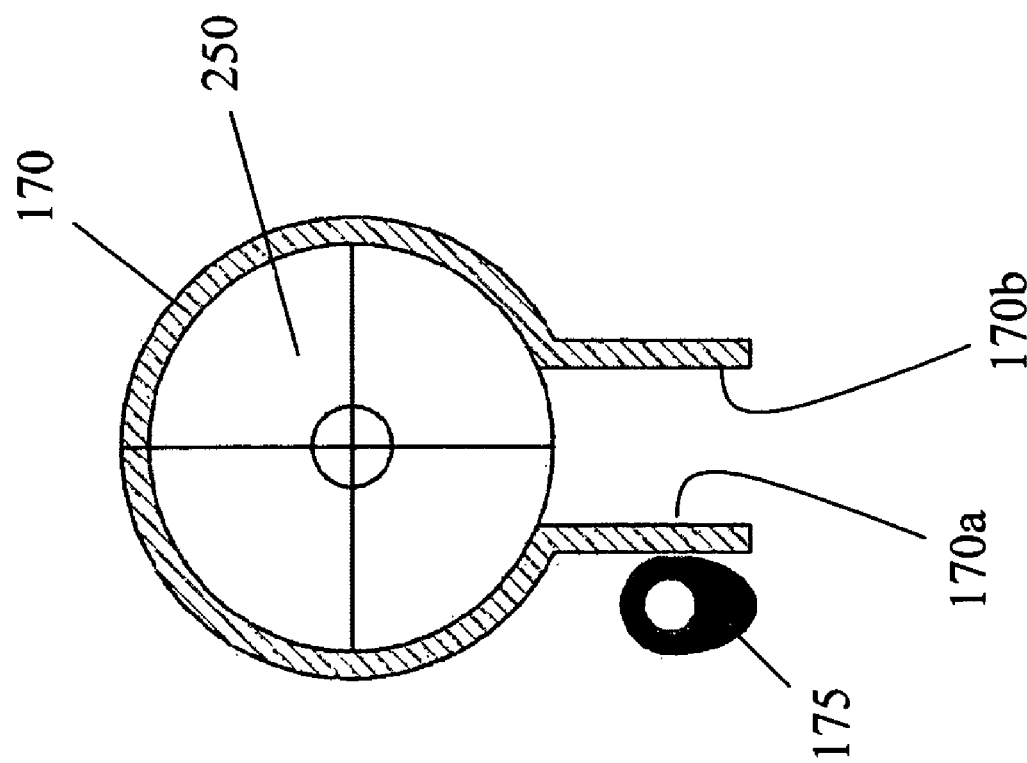

VARIABLE MOTION CONTROL DEVICES FOR TRANSMISSION AND OTHER IMPLEMENTATIONS AND METHODS OF USE THEREOF

CROSS-REFERENCE TO RELATED APPLICATIONS

The present application claims the benefit of U.S. Provisional Application No. 60/705,490, filed Aug. 5, 2005, titled "VARIABLE CONTROL DEVICE FOR GEAR PUMP AND OTHER IMPLEMENTATION AND METHODS OF USE THEREOF," which is incorporated herein by reference in its entirety.

BACKGROUND OF THE INVENTION

1. Field of the Invention

The present invention relates to variable motion control devices and methods of use, such as for providing a variable output vehicle transmission and other applications, wherein an output from a power source is input into the device, which then provides a variable output to the output application, such as a vehicle.

2. Background of the Technology

There remains an unmet need for variably transmitting the output of a power source to an output device, such as a vehicle or other output device, including where either a fixed or generally uniform input or a variable input is used to generate a variable output therefrom.

SUMMARY OF THE INVENTION

The present invention relates to variable motion control devices and methods of use thereof. In particular, the present invention provides several implementations of variable motion control devices for use with transmission applications for vehicles and other applications. The devices of some of the embodiments of the present invention receive as driving input constant or generally uniform output of power sources, or variable output from power sources, and transmit output to the application, such as a vehicle transmission or other output device.

To receive the constant or variable input and then transmit this input to a variable output, the devices and methods of the various embodiments include use of mechanical components, such as one-way bearings (also interchangeably referred to herein as a sprag clutches, one way clutch bearings, sprag bearings, or sprag clutch bearings), planetary gear systems, various types of dynamic or static brakes, cams and cam related features, devices and features to generate rectifying waveforms, pin and piston assemblies that use the vertical motion of cam followers, and worm gears and worm assemblies.

Additional advantages and novel features of the invention will be partially set forth in the description that follows, and will also become apparent to those skilled in the art upon examination of the following or upon learning by practice of the invention.

BRIEF DESCRIPTION OF THE DRAWINGS

In the drawings:

FIGS. 2A-2B present additional cutaway views of the TVC of FIGS. 1A-2B;

FIGS. 5A and 5B present views of cam control features usable with the variable motion control device of FIG. 3, in accordance with embodiments of the present invention;

FIGS. 6A and 6B contain views of concentric and eccentric rotation positions of the cam control features of FIGS. 5A and 5B;

FIGS. 11A and 11B present views of brake cam operation with a brake band, in accordance with an embodiment of the present invention.

DETAILED DESCRIPTION

Figures 1A, 1B:
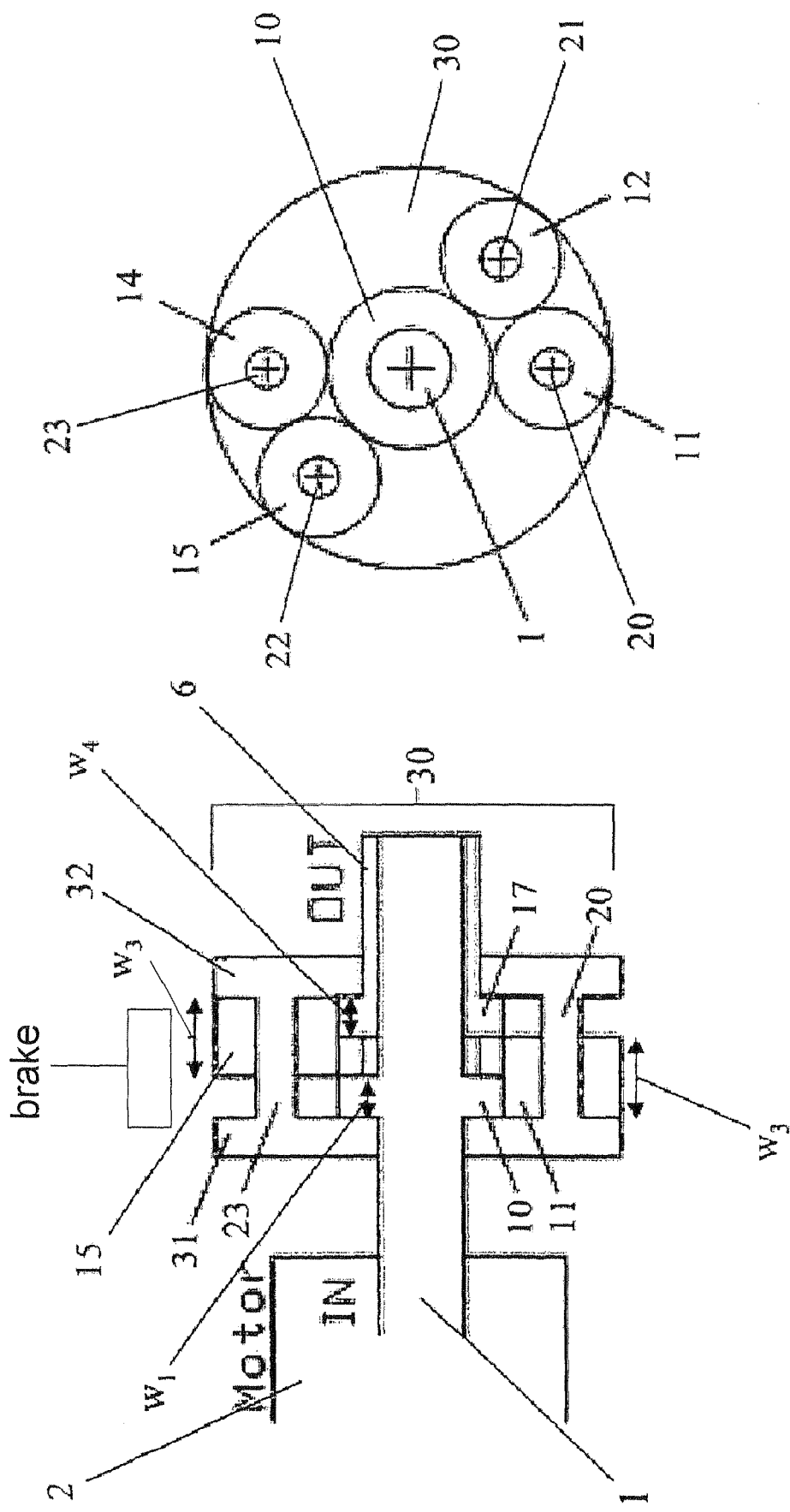
FIGS. 1A-1B show side and cross-sectional views of a TVC using a planetary gear type arrangement with most gears having approximately common diameters, in accordance with an embodiment of the present invention.

Various exemplary embodiments of the present invention will now be described in conjunction with the appended figures.

TVC-Type Variations

FIGS. 1A-2B illustrate cutaway side and other views of a three variable control (TVC) -type infinitely variable motion control (IVMC) device (also interchangeably referred to herein as a "TVC-type transmission"), in accordance with an exemplary embodiment of the present invention. The TVC device of FIGS. 1A-2B includes an input shaft 1 that extends from a power source 2, such as a motor, into an output sleeve shaft 6. The input shaft 1 has an extending first input shaft gear 10 (also interchangeably referred to herein as a "sun gear") having first gear exterior teeth and width $w_1$. First gear 10 operatively engages a second gear 11 having second gear exterior teeth and width $w_2$, such as by meshable engagement of the gear teeth, the width $w_2$ being such as to thereby allow the second gear 11 to engage both the first gear 10 and a third planetary gear 12, having width $w_3$. A fourth planetary gear 14 may have width $w_2$ and a fifth planetary gear 15 may have width $w_3$ that similarly meshably engage via external teeth, with fourth gear 14 engaging first gear 10 via external teeth.

Third gear 12 and fifth gear 15 engage sixth gear 17 fixably attached to output sleeve shaft 6.

Second gear 11 slidably revolves around axle 20, third gear 12 slidably revolves about axle 21, fourth gear 14 slidably revolves around axle 23, and fifth gear 15 slidably revolves around axle 22. Axles 20, 21, 22 and 23 are mounted to drum gear 30, having fixably attached external teeth gear portions 31, 32, thereby coupling second gear 11, third gear 12, fourth gear 14, and fifth gear 15 to drum gear 30. External teeth gear portions 31, 32 of drum gear 30 are engaged, via various features, including each of the embodiments disclosed in U.S. Patent Publication No. 2005/0076730A1 (the '730 application), now U.S. Pat. No. 7,462,124, by any controller that is capable of applying a variable input to the external teeth gear portions 31, 32, whereby the output of the sleeve shaft 6 is variably controlled.

In operation, the power source (e.g., output shaft of a driving device, such as an engine) produces revolution of the input shaft 1, which in turn revolves first gear 10. First gear 10 in turn engages second gear 11 and fourth gear 14, second gear 11 and fourth gear 14 in turn engaging third gear 12 and fifth gear 15, respectively. Third gear 12 and fifth gear 15 in turn engage sixth gear 17. The output of sleeve shaft 6, which for example, may be coupled to a vehicle's drive shaft or other output application, via sixth gear 17 varies depending on the rotational motion of the drum gear 30.

In a first exemplary operational mode, when the controller provides minimal input from the controller to the external teeth gear portions 31, 32 of the drum gear 30 (e.g., minimal resistance to rotary motion of drum gear 30), the drum gear 30 rotates, allowing engaged second gear 11, third gear 12, fourth gear 14, and fifth gear 15 to revolve about first gear 10 and hence about sixth gear 17, producing minimal or zero output at sleeve shaft 6.

In a second exemplary operational mode, when the controller provides a relatively high input from the controller to the external teeth gear portions 31, 32 of the drum gear 30 (e.g., high resistance to rotary motion of drum gear 30), rotation of the drum gear 30 is arrested, preventing rotation thereof. As such, second gear 11, third gear 12, fourth gear 14, and fifth gear 15 are prevented from revolving about first gear 10. Rotation without revolution of second gear 11, third gear 12, fourth gear 14, and fifth gear 15 engaged with sixth gear 17 producing maximum rotation of sixth gear 17 and hence maximum output at sleeve shaft 6.

In a third exemplary operational mode, when the controller provides a partial input from the controller to the external teeth gear portions 31, 32 of the drum gear 30 (e.g., partial resistance to rotary motion of the drum gear 30), the rotational motion of drum gear 30 is retarded, but not arrested. As such, second gear 11, third gear 12, fourth gear 14, and fifth gear 15 are thereby retarded in revolution about first gear 10. Retarded revolution of second gear 11, third gear 12, fourth gear 14, and fifth gear 15 engaged with sixth gear 17 produces a retarded rotation of sixth gear 17, and hence an output at sleeve shaft 6 that varies with retardation of revolution of drum gear 30.

Ratchet-Type Variations

A first exemplary implementation of the present invention incorporates several embodiments of the TVC-type or other IVMC devices to provide a vehicle transmission or other output application.

One embodiment of the IVMC device of the present invention, which may be implemented, for example, further using one or more one-way bearings (also interchangeably referred to herein as a sprag clutch, one way clutch bearing, sprag bearing, a sprag, or sprag clutch bearing; see, for example www.formspring.com/PDF/P-956-FC-Pq6-7.pdf as viewed Jul. 29, 2006, describing an exemplary sprag clutch usable with the present invention, the entirety of which is hereby incorporated by reference).

One characteristic of the sprag clutch is that the device can connect two subgear shafts or other rotating or otherwise moving bodies together, such that one shaft or body is allowed to move in one direction relative to the other shaft or body, but not in the opposite rotational direction, thereby allowing a load to be placed on one shaft or body and the gear carrier disk, for example, to be powered with an equal torque while the loaded shaft or body moves at the same speed (also interchangeably referred to herein as the shaft having the same "rotational velocity" or the body having the same "frequency" of motion) as the gear carrier disk. Meanwhile, the unloaded shaft or body has a torque applied thereto by the sprag clutch bearing in order to maintain a steady state condition in a single direction of motion only.

The IVMC device may be attached to, or be incorporated within, the output device, wherein a shaft from the power source is connected to the IVMC device with the output device, so as to convey the input thereto. Alternatively, it is within the scope of the invention to provide the IVMC device within the envelope or housing of the power source, such that the output shaft of the IVMC device serves as the output shaft of the power source. It is further within the scope of the present invention to provide that the output of the power source is conveyed to the IVMC device by a direct gear match, a belt drive, or a bracket having a shaft extending through the center of the device, for example.

To obtain a full range of speed, some embodiments of the present invention incorporate dynamic braking which is applied to the IVMC device, wherein the brake must slip. It is within the scope of the present invention to implement any one of several suitable dynamic or static braking options to control the IVMC device, such as, hydraulic or fluid based, electromechanical, or mechanical.

Examples of hydraulic based braking control include, but are not limited to, a viscous plate, a clutch pack, a hydraulic motor having any one of a variable flow, variable fins, or a piston pump, or a damper.

With respect to electromechanical based braking control, examples include, but are not limited to, a permanent magnet, an electro-magnet using a permanent magnet, a hysteresis brake, a magnetic particle brake, a ferrofluid damper, or an eddy current brake.

Regarding mechanical based braking control, examples include, but are not limited to, a mechanically, hydraulically, pneumatically, or electro-magnetically actuated friction pad, a band brake or a thrust bearing, both of which could be traction fluid enhanced, a spring force, a gyroscope, a variable length rotation arm, or a friction pad that can be actuated mechanically, hydraulically, pneumatically, or electro-mechanically. Exemplary embodiments of mechanical based braking control are described further below with reference to FIGS. 3A-13.

Consequently, the IVMC device of the present invention varies the rate of the gear pump or vehicle input (e.g., drive shaft), which conventionally had operated at a fixed rate, since, for example, the gear pump may typically have previously operated (i.e., in prior art applications) simply as a fixed gear ratio pump directly powered by the constant or steady rate at which the power source moved.

Figure 3B:
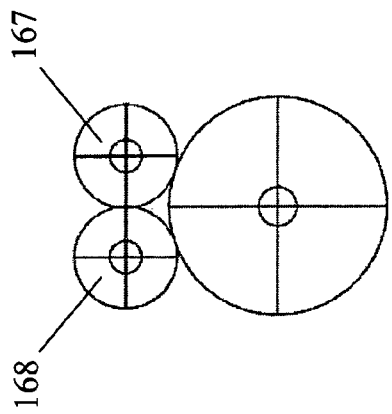
FIG. 3 show representative views of features relating to a variable motion control device for an exemplary transmission application, in accordance with an embodiment of the present invention.
Figure 3C:
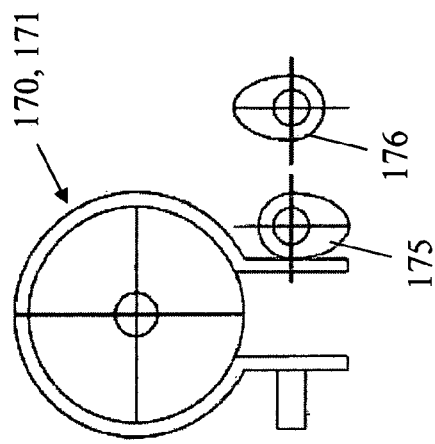
Figure 3A:
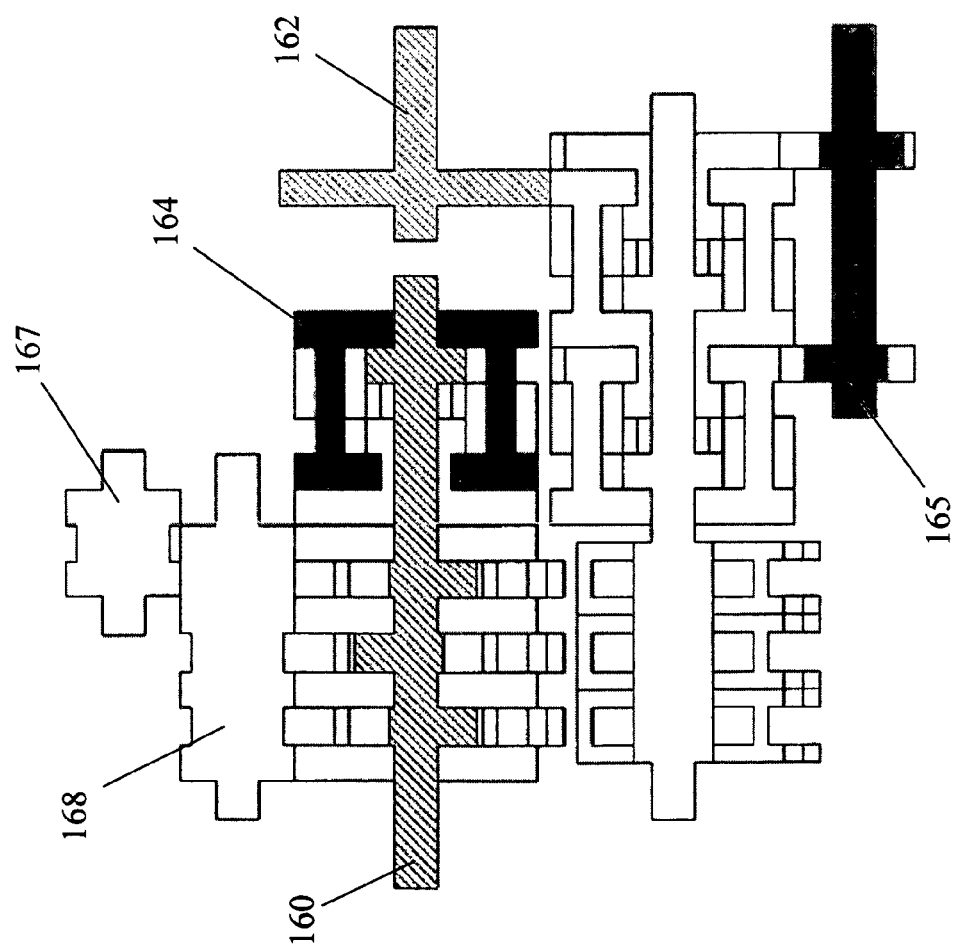

FIGS. 3A-3C show features relating to an exemplary transmission application (also interchangeably referred to herein as a "ratchet type transmission"), in accordance with an embodiment of the present invention. The features shown and described with regard to FIGS. 3A-13 are generally usable with other embodiments of the applicant's variable motion control devices, including the variations shown in FIGS. 1-2 and described herein.

As shown in FIG. 3A, the ratchet type transmission includes an input shaft 160, an output shaft 162, a speed control drum 164, and a direction control feature 165. In one embodiment, as shown in the representative diagram of FIG. 3C, the speed control and/or direction control features 164, 165 include, for example, band type brake portions 170, 171 and one or more cam portions 175, 176.

Figure 4:
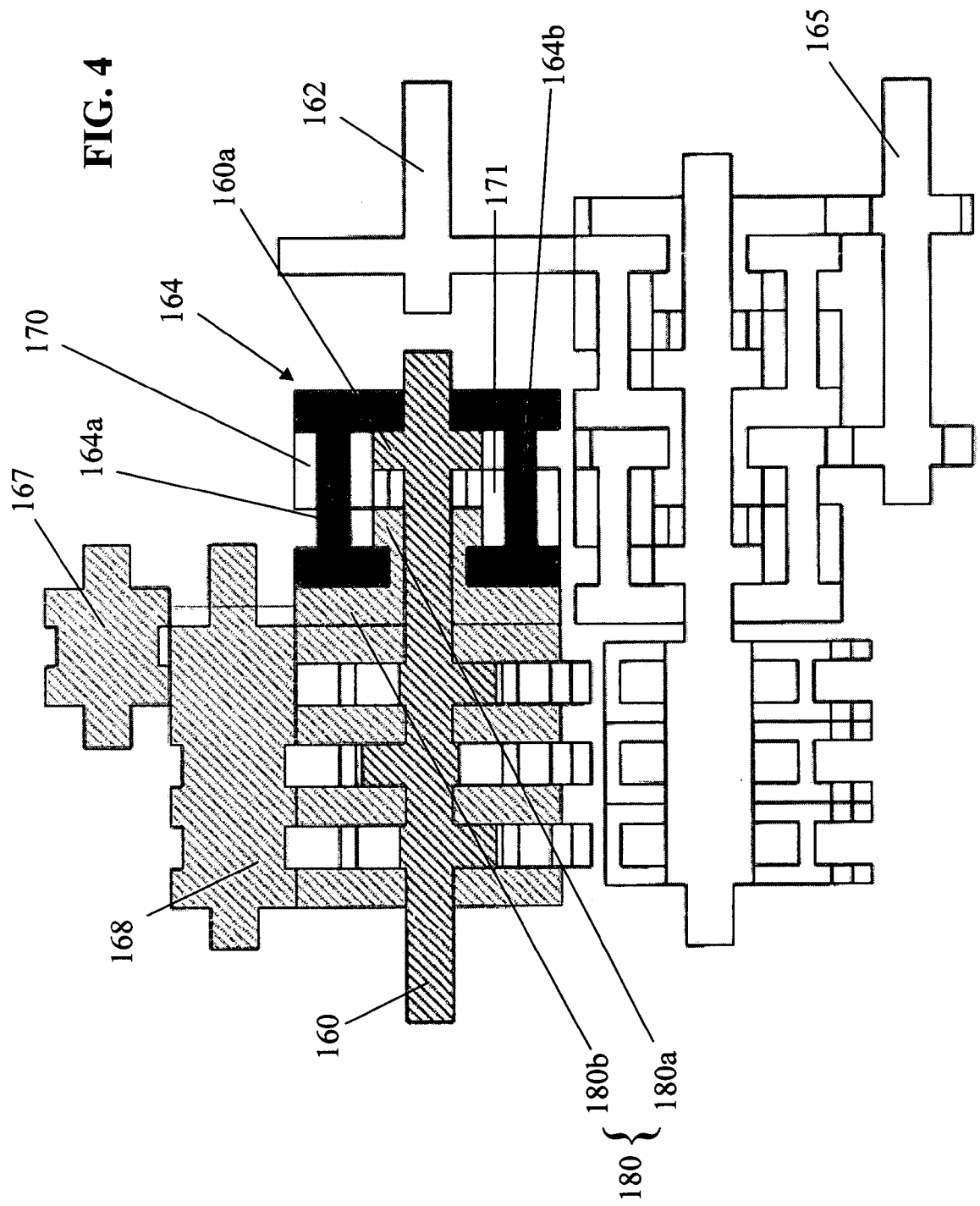
FIG. 4 shows a representative cross-sectional view of the variable motion control device of FIG. 3, focusing on input, speed control, and output features.

As shown in FIG. 4, the input 160, such as from a rotating input shaft attached to a driving source (e.g., an engine), is split using a control feature that includes a first planet gear 167, a second planet gear 168, and an output sleeve gear 180, similarly to the embodiments described, for example, in FIGS. 1 and 2 above. Also shown in FIG. 4 are speed control output features.

In FIG. 4, a sun gear 160a is attached to the input shaft 160. The sun gear 160a, via a first sleeve gear 170 and a second sleeve gear 171 rotating about axles 164a, 164b on the speed control drum gear 164, engages the output sleeve gear portion 180 at a first sleeve gear 180a. The first sleeve gear 180a is attached to a second sleeve gear 180b.

The second sleeve gear portion 180b engages a first planet gear 167, in turn engaging a second planet gear 168.

Alternatively, the device of FIGS. 3A-4 can be used with input occurring via gear 167, and control via shaft 160. Input from gear 167 in thise use is thereby splittably output to gear portion 180b and second planet gear 168.

Output of the present invention is produced using a plurality of cam features, similarly to as described in Applicant's U.S. Pat. No. 5,116,292 ("the '292 patent") and U.S. Pat. No. 5,308,293, the entirety of each of which is incorporated herein by reference. In the '292 patent, circular cams 49, pins 50, 51, circular disks 48, and slotted control disks 31, 32 are used. As shown in FIGS. 5A and 5B of the present application, an inner cam 200 (similar to circular disks 48 of the '292 patent) is circularly shaped and mounted off center relative to the input shaft 160. An outer cam 205 (similar to the circular cams 49 of the '292 patent), which is also circularly shaped, has a pin 206 and an opening 207 off center. The opening 207 receives the inner cam 200 and allows the outer cam 205 to slidably rotate about the inner cam 200. A slotted gear 210 (similar to slotted control disks 31, 32 of the '292 patent) has a slot 211 for receiving the pin 206 of the outer cam 205, and an opening 212 for slidably rotatably receiving the input shaft 160.

In operation, similarly as to operation described in the '292 patent, positioning of the pin 206 relative to the input shaft may be controlled via relative movement of the outer cam 205 to the inner cam 200 (e.g., using another cam disk, such as or similar to the cam disk 26 having a curved spiral slot 32 of the '292 patent), such that the outer cam 205 either rotates concentrically with the input shaft 160 or revolves about the input shaft 160 eccentrically. The path of revolution thus may be varied by varying the location of the pin 206 relative to the slot 211, from the concentric position of FIG. 6A to the maximum revolution travel (e.g., center of outer cam 205 revolves about input shaft 160 at maximum distance from input shaft 160) of FIG. 6B. Control using another cam disk with a spiral slot may be effectuated, for example, via rotational motion of the control drum 164.

Figure 7B:
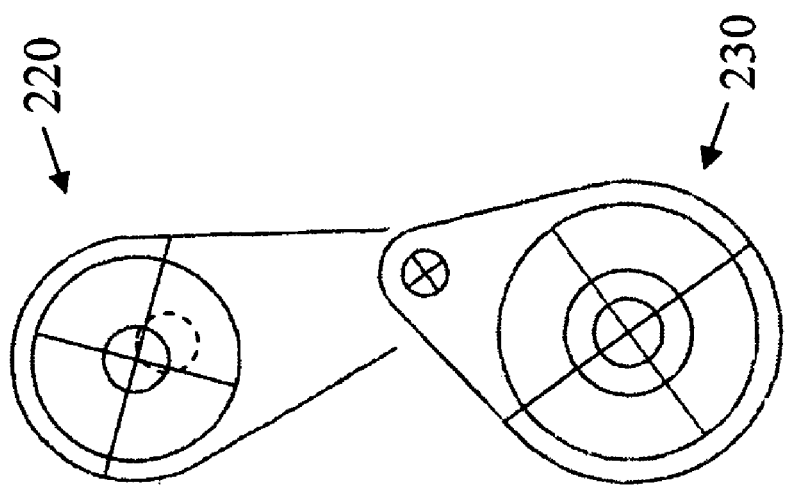
FIGS. 7A-7B show representative cyclic views of cam device and sprag device motion based on eccentric cam revolution, in accordance with an embodiment of the present invention.
Figure 7A:
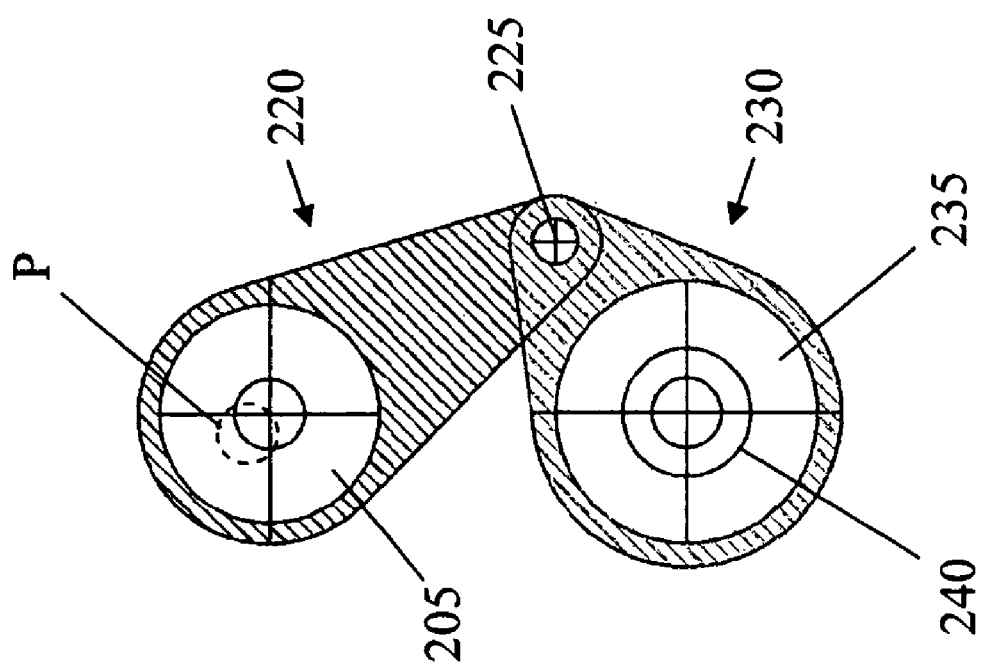

As shown in FIGS. 7A-7B, the outer cam 205 slidably rotates within a cam device 220 (also interchangeably referred to herein as a "cam conrod"), such that the cam conrod 220 either remains motionless (when the outer cam 205 revolves concentrically with the input shaft 160, as shown in FIG. 6A), or the cam conrod 220 moves back and forth (also interchangeably referred to herein as having a "cyclic pivoting motion") as a result of revolution of the outer cam 220 (when the outer cam 205 revolves eccentrically, as shown in FIG. 6B). Revolution of the outer cam 220 causes the back and forth movement of the cam conrod 220. This motion of the cam conrod 220, via a pin 225 or other operatively coupling mechanism, in turn causes a sprag device 230 (also interchangeably referred to herein as a "sprag conrod") to correspondingly move back and forth (in a cyclic pivoting motion) about a sprag 235 sleeving a sprag output shaft 240. Due to such use of the sprag 235, the sprag output shaft 240 moves in one rotational direction only.

Increased speed of movement of the sprag conrod 230 may be obtained by increasing the travel of the revolution of the outer cam 205, producing corresponding increase in the speed of the back and forth movement (i.e., increased frequency of the back and forth cycle) of the cam conrod 220. Alternatively, or in addition, rotational speed of the sprag output shaft 240 may be increased by increasing the rotational speed of the input shaft 160 (e.g., by increasing driving engine or other input device speed). Rotational speed of the sprag output shaft 240 may similarly be decreased by reducing travel of the outer cam 205 and/or by decreasing rotational speed of the input shaft 160.

Figure 8:
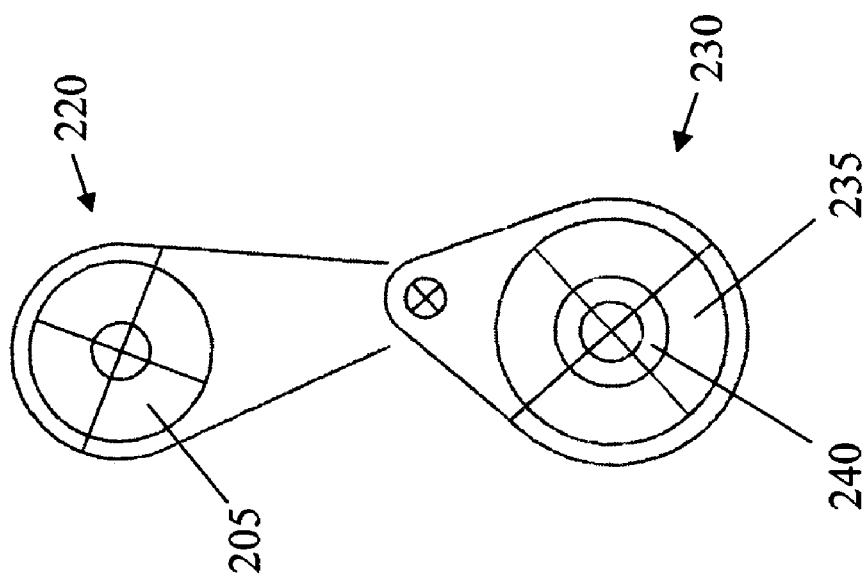
FIG. 8 presents a representative view of cam device and sprag device motion based on concentric cam revolution, in accordance with an embodiment of the present invention.

FIG. 8 shows positioning of the cam conrod 220 and sprag conrod 230 when the outer cam 205 rotates concentrically with the input shaft 160 (FIG. 6A), thereby producing no back and forth motion of the cam conrod 220 or the sprag conrod 230.

Figure 9:
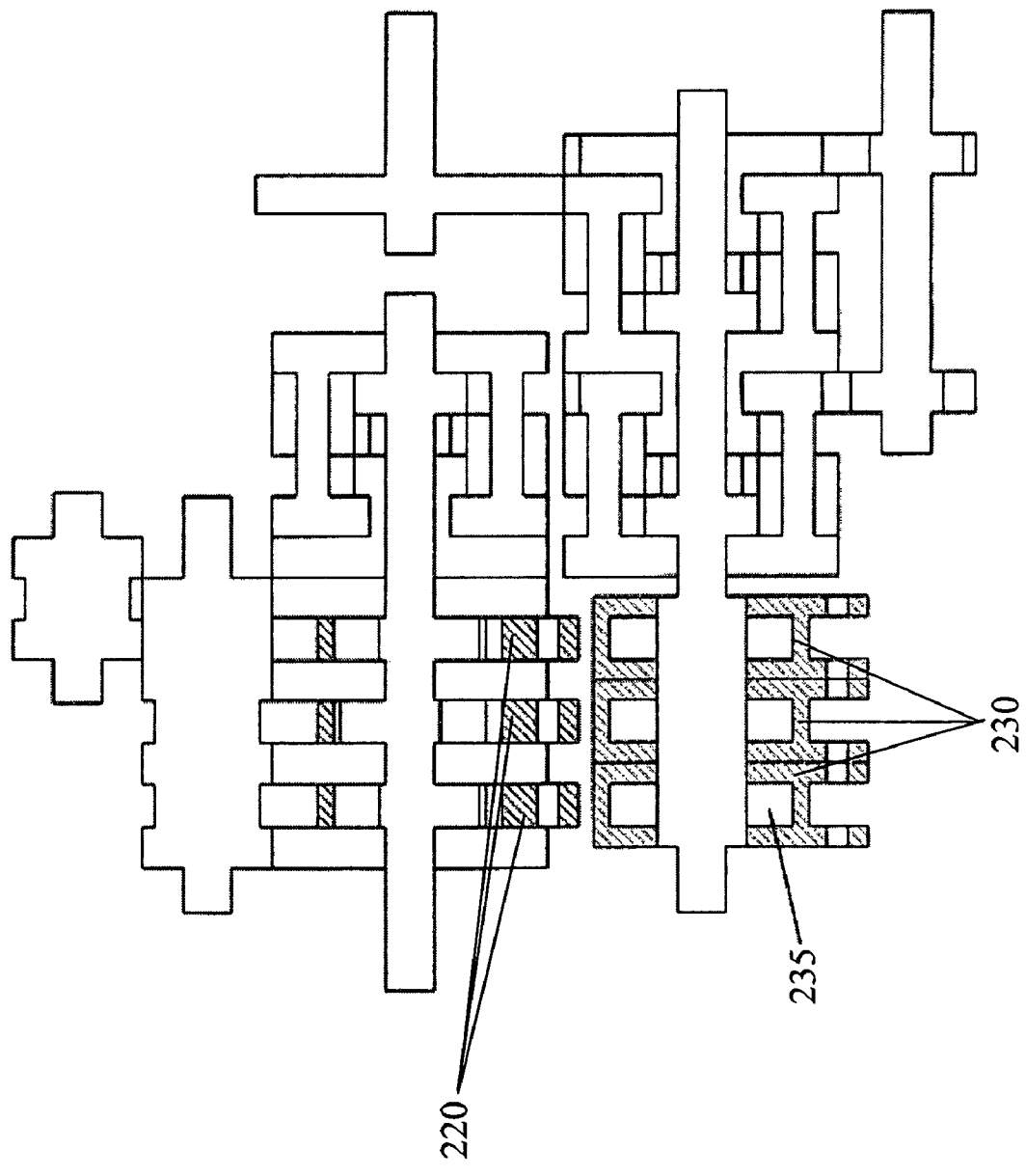
FIG. 9 contains a representative cross-sectional view of the variable motion control device of FIG. 3, focusing on cam control features, in accordance with an embodiment of the present invention.

FIG. 9 shows representative relative positioning of a plurality of cam conrods 220, sprags 235, and sprag conrods 230 within an exemplary variable motion control device in accordance with embodiments of the present invention.

Figure 10:
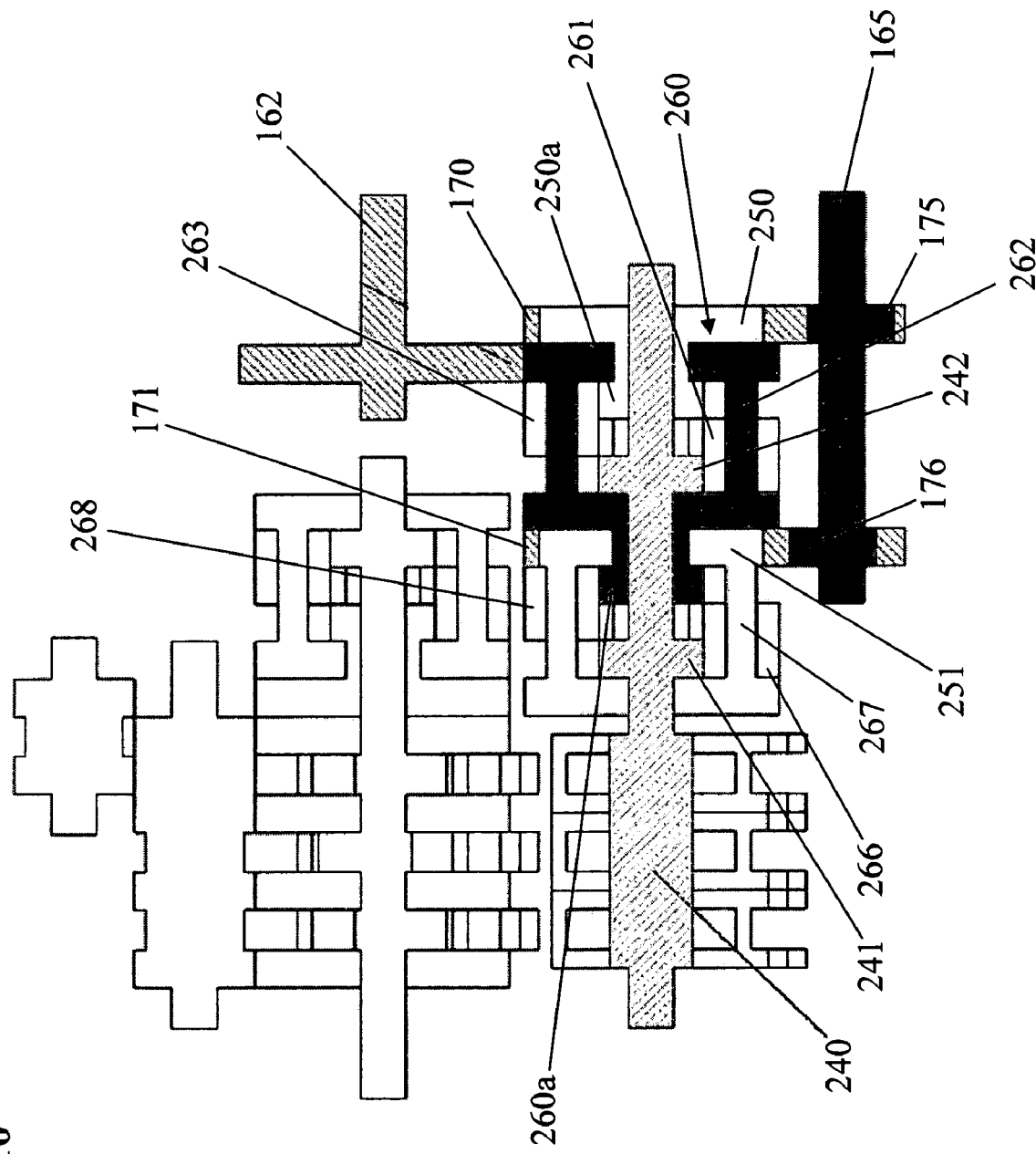
FIG. 10 shows a representative cross-sectional view of the variable motion control device of FIG. 3, focusing on sprag output and direction features, in accordance with an embodiment of the present invention.

FIGS. 10-11B illustrate operation of the output shaft 162 for directional control, such as via use of one or more braking cams 175, 176 braking or releasing corresponding brake disks 250, 251. Output drum 260 revolves in either a first direction (e.g., braking of the first brake disk 250) or a second direction (e.g., braking of the second brake disk 251). The absence of braking by either of the brake bands 170, 171 allows a neutral to occur. Output 162 therefore is in either a first rotational direction, neutral (no rotation), or a second rotational direction, depending on application of the braking.

For example, in one embodiment, two braking cams 175, 176 are used, one cam 175, 176 corresponding to each of the two brake bands 170, 171. When one of the braking cams (e.g., braking cam 175 shown in FIG. 11A) is in the orientation shown in FIG. 11A, minimal compression is provided on the extension 170a of the brake band 170 (in this example, the second extension 170b is fixably held), allowing the brake disk 250 to rotate unimpeded. When the brake cam 175 is in the orientation of FIG. 11B, compression is provided by the lobe of the brake cam 175 on the extension 170a of the brake band 170, resulting in frictional braking of the brake disk 250 (e.g., increased frictional resistance via compression of the brake band 170 due to the force applied to the extension 170a, while second extension 170b remains fixably held).

In operation, for example, sprag output shaft 240 has attached sun gears 241, 242. Sun gear 242 meshably engages sleeve gear 261, which revolves about axle 262 of output drum 260. Sleeve gear 261 engages second sleeve gear 263 (shown in representative position), which, in turn, engages gear 250a attached to brake disk 250. Absent braking of brake disk 250, brake disk 250 is free to rotate, resulting in no rotational movement of output drum 260. Engagement of the first braking cam 175 with the first band 170 produces frictional braking of the brake disk 250, such that the second sleeve gear 263 revolves about gear 250a, thus producing rotational motion of output drum 260 in a first rotational direction.

Similarly, sun gear 241 meshably engages third sleeve gear 266, which revolves about axle 267 attached to brake drum 251. Third sleeve gear 266 engages fourth sleeve gear 268 (shown in representative position), which, in turn, engages gear 260a attached to output drum 260. Absent braking of brake disk 251, brake disk 251 is free to rotate, resulting in no rotational movement of output drum 260. Engagement of the second braking cam 176 with the second band 171 produces frictional braking of the brake disk 251, such that the gear 260a revolves in response to rotation of gear 268, thus producing rotational motion of output drum 260 in a second rotational direction.

Disengagement of both braking cams 175, 176 results in no engagement of either band 170, 171, thereby producing a neutral position (non-rotation of the output drum 260, and thus non-rotation of the output shaft 160 meshably engaged therewith).

In one embodiment, both braking cams 175, 176 are located on a single engagement shaft 165. Control of cam orientation may be made, for example, via mechanical, electrical, or other rotational engagement of the cams. For example, in one embodiment, one or more servo motors electrically control orientation of the cams in response to lever movement or depression of one or more buttons. In another embodiment, a direct mechanical link (e.g., lever) or links with the cams cause change in cam orientation in response to lever movement.

Figure 13:
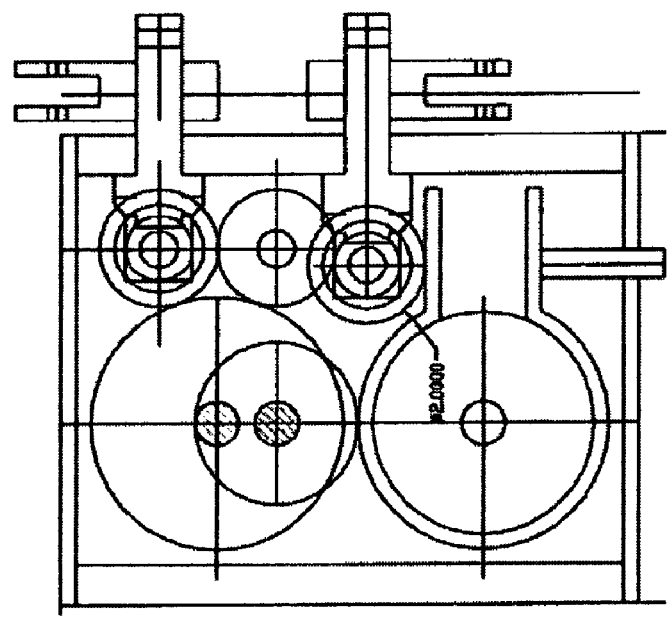
FIGS. 12 and 13 show cutaway side and cross-sectional views, respectively, of an exemplary transmission, including cam features and brake band directional control, in accordance with embodiments of the present invention.
Figure 12:
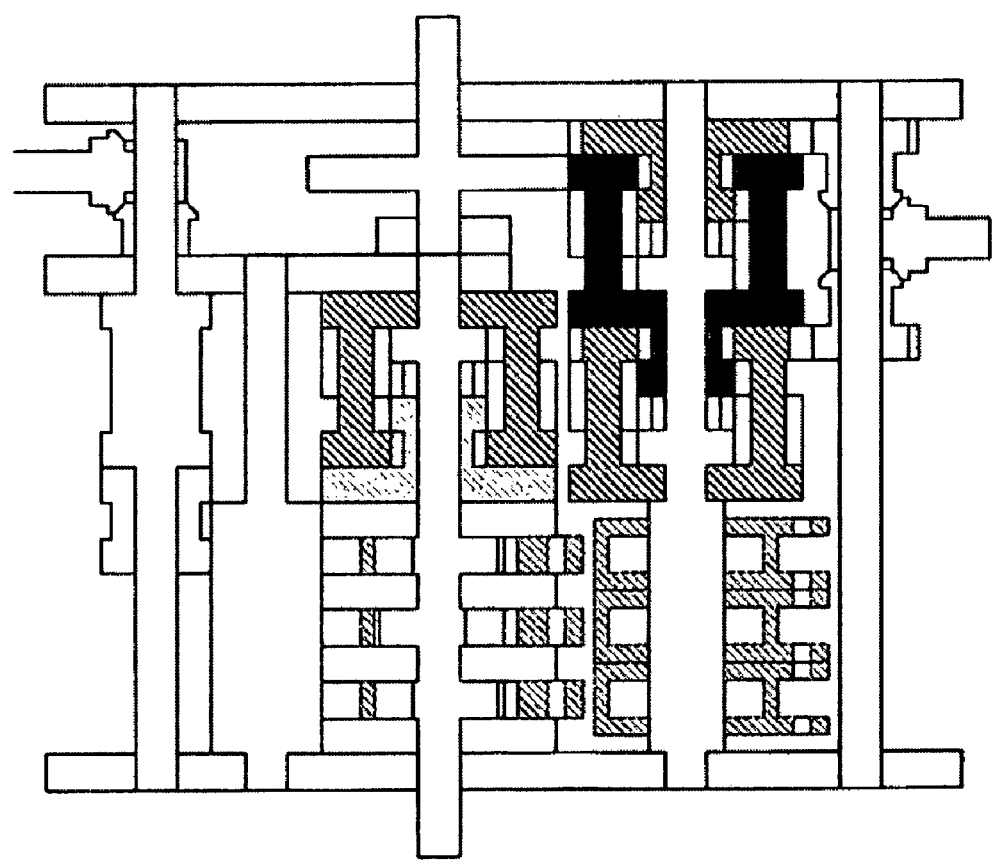

FIGS. 12 and 13 show cutaway side and end cross-sectional views of an exemplary transmission, including cam features and brake band directional control, in accordance with embodiments of the present invention.

Operation using the variable motion control device of FIGS. 3A-13 will now be described with respect to an exemplary vehicle application. In operation in a vehicle, input to the transmission is received from a running engine shaft output. The speed of output from the transmission is controlled by, for example, a lever (or for example, travel of a foot-controlled accelerator) that allows variation in the revolution of the outer cam, thereby varying, via the cam conrod, the amount of ratchet motion, and thus, along with variation in engine speed (producing corresponding control of input shaft speed), speed of rotational output in a single direction from the sprag conrod. A second lever (or, for example, a button) to partly or fully engage the braking feature may be used to cause the resulting output to be in a first rotational direction, neutral, or a second rotational direction. The resulting output (via the output shaft) may be connected, for example, via a drive shaft and differential to one or more vehicle wheels, allowing forward, neutral, and reverse operation of the vehicle via the wheels.

Similarly, the first and second lever could be combined, for example, in a single control mechanism. For example, an accelerator pedal that pivots about a central point could cause the vehicle to go forward and accelerate when pivoted in a first rotational direction about the pivot (e.g., by an operator depressing the top of the pedal with the ball of the operator's foot) and in a reverse direction and accelerate in reverse when pivoted in a second rotational direction about the pivot (opposite the first rotational direction, such as by the operator depressing the bottom of the pedal with the heel of the operator's foot). This method of operation may be especially useful, for example, to allow the vehicle to be rocked forward and backward so as to escape being stuck (e.g., in mud or snow).

Example embodiments of the present invention have now been described in accordance with the above advantages. It will be appreciated that these examples are merely illustrative of the invention. Many variations and modifications will be apparent to those skilled in the art.

The invention claimed is:

1. A variable motion control device, comprising:
   an input shaft having an attached input shaft gear;
   a plurality of operatively engaged gear portions, the plurality of operatively engaged gear portions being operatively coupled to the input shaft gear;
   a rotating drum gear, wherein at least one of the plurality of operatively engaged gear portions is mounted to the rotating drum gear, and wherein the rotating drum gear is selectively brakeable such that rotational velocity of the rotating drum gear is correspondingly selectively variable; and
   an output shaft operatively coupled with the rotating drum gear, wherein motion of the output shaft varies selectively with selective variation of the rotational velocity of the rotating drum gear,
   wherein the variable motion control device further comprises a variably rotational cam, the variably rotational cam having a rotational motion varying with rotational motion of the input shaft.

2. The device of claim 1, wherein if no braking of the drum gear is provided, the output shaft has no motion.

3. The device of claim 1, wherein the output shaft has a rotational velocity, and wherein, if the braking prevents the motion of the rotating drum gear, the rotational velocity of the output shaft is maximized.

4. The device of claim 1, wherein the rotating drum gear has a plurality of teeth, the device further comprising:
   a brake device having a plurality of teeth, the plurality of teeth of the brake device being meshably engaged with the plurality of teeth of the rotating drum gear.

5. The device of claim 1, wherein the rotating drum gear has a brake disk portion; the device further comprising:
   a variably engageable brake band operatively engaged with the brake disk portion of the rotating drum gear.

6. The device of claim 5, further comprising:
   a brake cam;
   wherein the variably engageable brake band is operatively engaged with the brake disk portion of the rotating drum gear via motion of the brake cam.

7. The device of claim 1, the rotating drum gear being selectively brakeable to vary direction the motion of the output shaft.

8. The device of claim 1, wherein the variably rotational cam has a concentric rotational motion with the rotational motion of the input shaft.

9. The device of claim 1, wherein the variably rotational cam has an eccentric rotational motion with the rotational motion of the input shaft.

10. The device of claim 9, wherein the eccentric rotational motion of the variably rotational cam has a variable path.

11. The device of claim 1, further comprising: a cam device coupled to the variably rotational cam; and a sprag device coupled to the cam device.

12. The device of claim 11, wherein the variably rotational cam is capable of eccentric motion, and when the variably rotational cam has eccentric motion, the variably rotational cam produces a cyclic pivoting motion in the cam device.

13. The device of claim 12, wherein the eccentric motion of the variably rotational cam is variable, wherein the cyclic pivoting motion of the cam device has a frequency, and wherein the frequency of the cyclic pivoting motion of the cam device varies with variation in the eccentric motion of the variably rotational cam.

14. The device of claim 12, further comprising:
a sprag shaft; wherein the sprag device is operably connected to the sprag shaft; and wherein the cyclic pivoting motion of the cam device produces motion of the sprag shaft in a single rotational direction via the sprag device.

15. The device of claim 1, wherein the rotating drum gear is selectively brakeable via at least one selected from a group consisting of a hydraulic brake, an electromechanical brake, and a mechanical brake.

16. The device of claim 15, wherein the hydraulic brake comprises one selected from a group consisting of a viscous plate, a clutch pack, a hydraulic motor having variable flow, a hydraulic motor having variable flus, a hydraulic motor having a piston pump, and a damper.

17. The device of claim 15, wherein the electromechanical brake comprises one selected from a group consisting of a permanent magnet, an electromagnet using a permanent magnet, a hysteresis brake, a magnetic particle brake, a ferrofluid damper, and an eddy current brake.

18. The device of claim 15, wherein the mechanical brake comprises one selected from a group consisting of a mechanically actuated friction pad, a pneumatically actuated friction pad, a hydraulically actuated friction pad, an electro-magnetically actuated friction pad, a band brake, a thrust bearing, a spring force, a gyroscope, a variable length rotation arm, and a friction pad.

19. A variable motion control device, comprising:
an input shaft having a variably rotational cam, the variably rotational cam having a rotational motion varying with rotational motion of the input shaft;
a cam device coupled to the variably rotational cam;
a sprag device coupled to the cam device;
a sprag shaft spraggably engaged with the sprag device; and
an output shaft operatively coupled to the sprag shaft,
wherein the sprag shaft has a first sprag shaft gear, the device further comprising:
a first rotating drum gear operatively engaged with the first sprag shaft gear, the device further comprising:
a first rotating drum gear operatively engaged with the first sprag shaft gear, wherein the first rotating drum gear has a first brake disk portion;
a first variably engageable brake band operatively engaged with the first brake disk portion of the first rotating drum gear; and
a first brake cam;
wherein the first variably engageable brake band is operatively engaged with the first brake disk portion of the first rotating drum gear via motion of the first brake cam.

20. The device of claim 19 wherein the device is a vehicle transmission.

21. The device of claim 19, wherein the variably rotational cam is selectably able to have a concentric rotational motion with the rotational motion of the input shaft.

22. The device of claim 21, wherein, if the variable rotational cam device is selected to have the concentric rotational motion with the rotational motion of the input shaft, no output motion occurs at the output shaft.

23. The device of claim 19, wherein the variably rotational cam is selectable to have an eccentric rotational motion with the rotational motion of the input shaft.

24. The device of claim 23, wherein the eccentric rotational motion of the variably rotational cam has a variable path.

25. The device of claim 23, wherein, if the variably rotational cam is selected to have eccentric rotational motion, the variably rotational cam produces a cyclic pivoting motion in the cam device.

26. The device of claim 25, wherein the eccentric motion of the variably rotational cam is variable, wherein the cyclic pivoting motion of the cam device has a frequency, and wherein the frequency of the cyclic pivoting motion of the cam device varies with variation in the eccentric motion of the variably rotational cam.

27. The device of claim 26, wherein the cyclic pivoting motion of the cam device produces a cyclic pivoting motion of the sprag device.

28. The device of claim 27, wherein the cyclic pivoting motion of the sprag device produces motion of the sprag shaft in a single rotational direction.

29. The device of claim 28, wherein the wherein output shaft has a rotational velocity, and wherein increase in the frequency of the cyclic pivoting motion of the cam device increases the rotational velocity of the output shaft.

30. The device of claim 29, wherein the input shall is driven by an output shaft of a driving device, the output shaft of the driving device having a driving device output shaft rotational velocity, and wherein increase in the output shaft rotational velocity increases the rotational velocity of the output device.

31. The device of claim 19, the first rotating drum gear being operatively engaged with the first sprag shaft gear via at least one first sleeve gear.

32. A variable motion control device, comprising:
an input shaft having a variably rotational cam, the variably rotational earn having a rotational motion varying with rotational motion of the input shaft;
a cam device coupled to the variably rotational cam;
a sprag device coupled to the cam device;
a sprag shaft spraggably engaged with the sprag device; and
an output shaft operatively coupled to the sprag shaft,
wherein the sprag shaft has a first sprag shall gear, the device further comprising:
a first rotating drum gear operatively engaged with the first sprag shaft gear, wherein the first rotating drum gear is operatively engaged with the first sprag shaft gear via at least one first sleeve gear; and
wherein the first rotating drum gear includes at least one axle, and wherein the at least one first sleeve gear sleevably rotates about the at least one axle of the first rotating drum gear.

33. A variable motion control device, comprising:
an input shaft having a variably rotational cam, the variably rotational cam having a rotational motion varying with rotational motion of the input shaft;
a cam device coupled to the variably rotational cam;
a sprag device coupled to the cam device;
a sprag shaft spraggably engaged with the sprag device; and
an output shaft operatively coupled to the sprag shaft,
wherein the sprag shaft has a first sprag shaft gear, the device further comprising:
a first rotating drum gear operatively engaged with the first sprag shaft gear, the device further comprising:
a first rotating drum gear operatively engaged with the first sprag shaft gear;
wherein the first rotating drum gear is selectively brakeable so as to produce motion of the output shaft in a first rotational direction.

34. The device of claim 33, wherein the sprag shaft has a second sprag shaft gear, the device further comprising: a second rotating drum gear operatively engaged with the second sprag shaft gear.

35. The device of claim 34, wherein the second rotating drum gear is operatively engaged with the second sprag shaft gear via at least one second sleeve gear.

36. The device of claim 35, wherein the second rotating drum gear includes at least one axle, and wherein the at least one second sleeve gear sleevably rotates about the at least one axle of the second rotating drum gear.

37. The device of claim 33, wherein the second rotating drum gear has a second brake disk portion, the device further comprising: a second variably engageable brake band operatively engaged with the second brake disk portion of the second rotating drum gear; and a second brake cam; wherein the second variably engageable brake band is operatively engaged with the second brake disk portion of the second rotating drum gear via motion of the second brake cam.

38. The device of claim 37, wherein the second rotating drum gear is selectively brakeable so as to produce motion of the output shaft in a second rotational direction.

39. The device of claim 38, wherein the first rotational direction is opposite in direction to the second rotational direction.

\* \* \* \* \*